United States Patent
Ress, Jr. et al.

(10) Patent No.: US 11,312,501 B1
(45) Date of Patent: Apr. 26, 2022

(54) DEPLOYABLE POWER PACK FOR A DUAL MODE HIGH SPEED PROPULSION SYSTEM

(71) Applicant: Florida Turbine Technologies, Inc., Jupiter, FL (US)

(72) Inventors: Robert A Ress, Jr., Carmel, IN (US); Joseph D Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 545 days.

(21) Appl. No.: 16/506,760

(22) Filed: Jul. 9, 2019

(51) Int. Cl.
*B64D 27/24* (2006.01)
*B64D 27/02* (2006.01)
*F25B 49/02* (2006.01)
*F25B 1/06* (2006.01)

(52) U.S. Cl.
CPC ............... *B64D 27/24* (2013.01); *F25B 1/06* (2013.01); *F25B 49/022* (2013.01); *F25B 49/025* (2013.01); *B64D 2027/026* (2013.01)

(58) Field of Classification Search
CPC ........ C64C 2201/167; B64D 2027/026; B64D 2041/005; B64D 37/12
USPC ...................... 244/73 R, 58, 137.4
See application file for complete search history.

(56) References Cited

U.S. PATENT DOCUMENTS

| | | | | | |
|---|---|---|---|---|---|
| 4,296,894 | A | * | 10/1981 | Schnabele | F42B 15/10 244/3.1 |
| 4,327,886 | A | * | 5/1982 | Bell | F02K 7/18 137/15.1 |
| 4,410,151 | A | * | 10/1983 | Hoppner | B64C 39/024 244/120 |
| 4,844,380 | A | * | 7/1989 | Peoples | B64G 1/002 244/3.22 |
| 7,194,852 | B1 | * | 3/2007 | Krishnan | F02K 7/10 60/250 |
| 9,969,491 | B2 | * | 5/2018 | Strayer | B64C 39/024 |
| 2009/0229241 | A1 | * | 9/2009 | Haight | F02K 1/52 60/204 |
| 2010/0251692 | A1 | * | 10/2010 | Kinde, Sr. | F02K 7/16 60/226.1 |
| 2017/0057635 | A1 | * | 3/2017 | Strayer | B64C 39/024 |
| 2021/0323670 | A1 | * | 10/2021 | Dalton | H01M 50/202 |

FOREIGN PATENT DOCUMENTS

WO WO-2021155385 A1 * 8/2021 ............. B64C 27/26

* cited by examiner

*Primary Examiner* — Christopher P Ellis
(74) *Attorney, Agent, or Firm* — Katherine Koenig; Koenig IP Works, PLLC

(57) ABSTRACT

An aero vehicle with a dual mode propulsion system that can operate in a first mode below a ramjet speed and a second mode at a ramjet speed. The first mode is operated using a compressor driven by an electric motor supplied with electrical power from a power pack. When the vehicle has reached a speed where the ramjet engine can operate, the power pack is dropped from the vehicle to decrease the weight of the vehicle.

8 Claims, 2 Drawing Sheets

DEPLOYABLE POWER PACK FOR A DUAL MODE HIGH SPEED PROPULSION SYSTEM

CROSS-REFERENCE TO RELATED APPLICATIONS

None.

GOVERNMENT LICENSE RIGHTS

None.

BACKGROUND OF THE INVENTION

Field of the Invention

The present invention relates generally to an aero vehicle, and more specifically to a dual mode propulsion system with a compressor driven by an electric motor from a battery.

Description of the Related Art Including Information Disclosed Under 37 CFR 1.97 and 1.98

A dual mode high speed propulsion system is being considered for an aero vehicle that can operate at Mach 5 speed. At such a speed, a ramjet engine is required. A ramjet engine is an engine that is a hollow duct with an inlet diffuser and an outlet exhaust nozzle with a combustion chamber formed in between. A ramjet engine does not have a rotor with a turbine. A ramjet engine will not produce positive thrust until around a speed of Mach 2.5. Positive thrust means that the thrust from the ramjet engine exceeds the drag force on the aircraft. Thus, a high speed air vehicle is typically powered by a rocket engine until the aircraft reaches a speed in which the ramjet engine can be started and produce positive thrust.

A ramjet, sometimes referred to as a flying stovepipe or an athodyd (aero thermodynamic duct), is a form of air breathing jet engine that uses the engine's forward motion to compress incoming air without an axial compressor or a centrifugal compressor. Because ramjets cannot produce thrust at zero airspeed, they cannot propel an aircraft from a standstill. A ramjet-powered vehicle, therefore, requires an assisted take-off like a rocket assist to accelerate it to a speed where it begins to produce thrust. Ramjets work most efficiently at supersonic speeds around Mach 3 (2,300 mph; 3,700 km/h). This type of engine can operate up to speeds of Mach 6 (4,600 mph; 7,400 km/h).

Ramjets can be particularly useful in applications requiring a small and simple mechanism for high-speed use, such as missiles.

As speed increases, the efficiency of a ramjet starts to drop as the air temperature in the inlet increases due to compression. As the inlet temperature gets closer to the exhaust temperature, less energy can be extracted in the form of thrust. To produce a usable amount of thrust at yet higher speeds, the ramjet must be modified so that the incoming air is not compressed (and therefore heated) nearly as much. This means that the air flowing through the combustion chamber is still moving very fast (relative to the engine), in fact it will be supersonic—hence the name supersonic-combustion ramjet, or scramjet.

BRIEF SUMMARY OF THE INVENTION

An aero vehicle is powered by a dual mode propulsion system that includes a ramjet engine and a compressor driven by an electric motor supplied with electrical power from a power pack (battery and a power control module). The compressor is used to supply compressed air to a core combustion chamber of the dual mode engine until the aircraft reaches a speed in which the ramjet engine can be started and produce a positive thrust. When the ramjet engine is producing sufficient thrust, the power pack is dropped from the aircraft to reduce the weight of the vehicle. The power pack is attached to the underside of the aircraft so that the space normally used for batteries and power control modules in the aircraft can then be used as additional space for fuel.

DETAILED DESCRIPTION OF THE INVENTION

The present invention is dual mode propulsion system for a high speed aircraft such as a missile. The propulsion system combines a core engine with a ramjet engine where the core engine produces thrust from a launch point to a flight condition where the ramjet takes over. The propulsion unit is an integrated assembly and includes an inlet and an exhaust system. A unique feature of the unit is that there is no turbine as the compressor is driven by a high power density motor mounted in the inlet structure. Eliminating the turbine and integrating the ramjet provides for a simpler, more robust and lower cost solution for the high speed missile propulsion.

Figure 1:
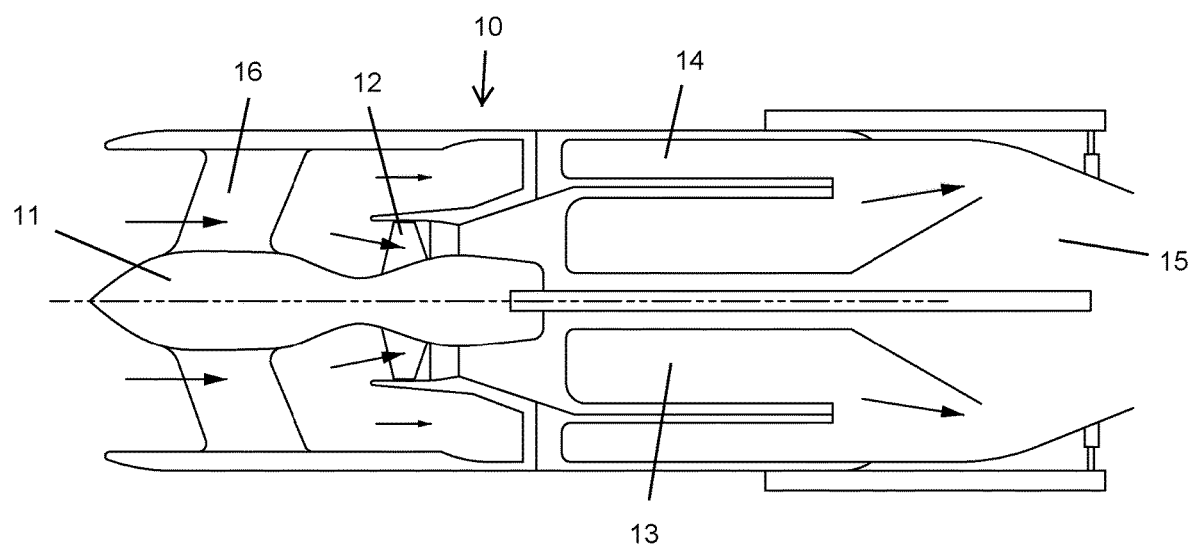
FIG. 1 shows a cross section view of a dual mode propulsion system for a high Mach missile of the present invention.

A high speed dual mode propulsion system 10 of the present invention is shown in FIG. 1 and includes a housing for an electric generator and bearings 11, a compressor 12 with rotating blades and stator vanes downstream from the blades, a core burner 13, a duct burner 14, a variable area convergent-divergent exhaust nozzle 15, and a strut 16 extending from a casing of the engine to support the housing 11. The stator vane of the compressor acts as a support for the aft end of the compressor housing. The dual mode propulsion system of FIG. 10 operates as follows: air enters the engine at the inlet and flows into the compressor 12 to be compressed and flows into the core burner 13 where fuel is injected and burned to produce a hot gas flow that exits through the variable area exhaust nozzle 15 to produce a thrust to move the aircraft. The compressor may be of the axial type, as shown, or may be a centrifugal or mixed flow types. The compressor 12 and the core burner 13 can be operated up to a speed from Mach 0.8 to Mach 2.5 where the ramjet engine can take over. The ramjet engine cannot produce a positive thrust (engine thrust greater than vehicle drag) until a certain speed is reached. At this speed, the inlet air flows into the duct burner 14 where fuel is injected from fuel nozzles in a strut extending from the engine housing to the inner duct burner surface to ignite and drive the ramjet engine. An inlet to the compressor can be blocked so that all of the air flow passes into the duct burner 14, or some of the air flow can flow through the compressor to windmill the compressor and drive the generator as a motor to produce electrical power for the aircraft.

Figure 2:
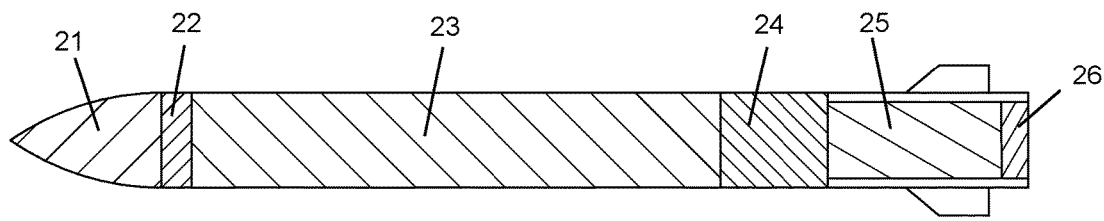
FIG. 2 shows a high speed missile internal arrangement of an earlier embodiment of the present invention.

A high speed missile employing the dual mode propulsion system shown in FIG. 1 is shown in FIG. 2. The missile includes an avionics section 21 in the forward cone, a warhead 22, a fuel tank 23, a battery and power control module (PCM) 24, a dual mode propulsion system 25, and an exhaust nozzle 26.

Figure 3:
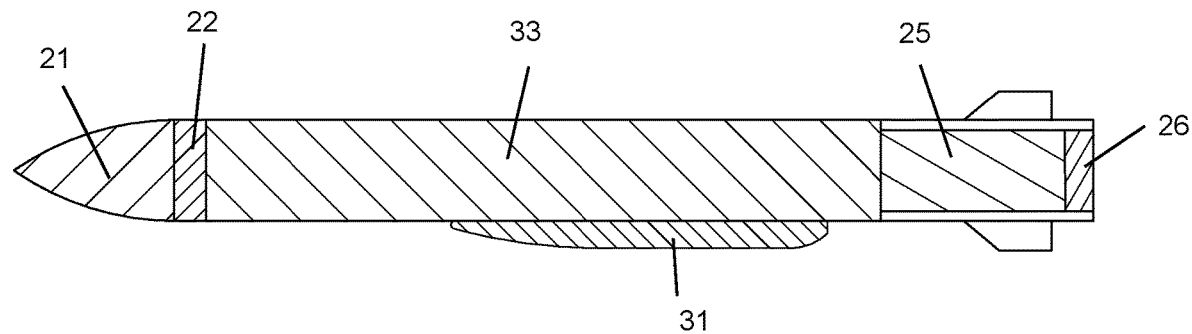
FIG. 3 shows a high speed missile with an external mounted battery pack of the present invention.
Figure 4:
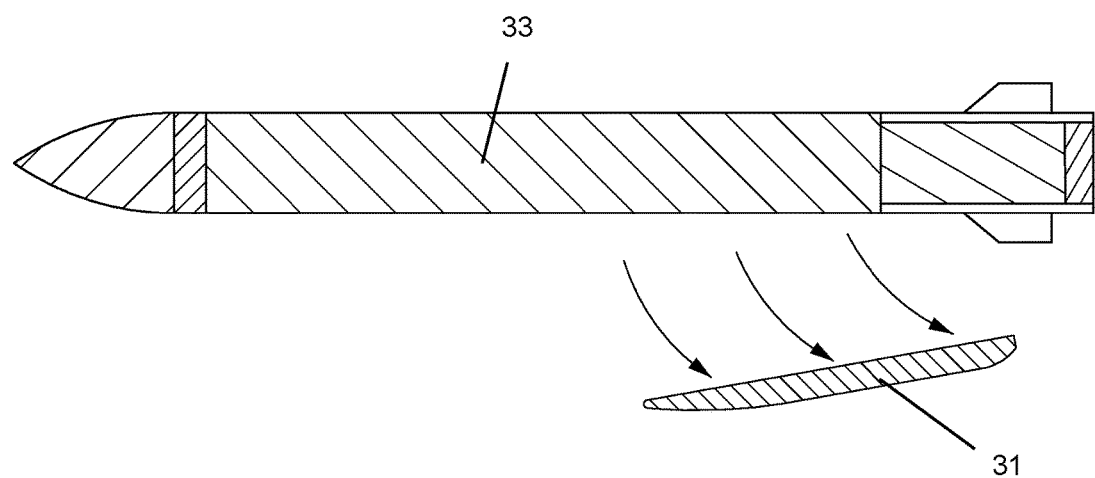
FIG. 4 shows the high speed missile of FIG. 3 with the battery pack dropped from the aircraft.

FIG. 3 shows a modified version of the FIG. 2 missile in which a power pack 31 containing a battery pack and a PCM is attached to the underside of the aircraft so that the fuel tank 33 can be enlarged since the battery and PCM section 24 in FIG. 2 is no longer used. The power pack 31 is only utilized during the boost phase of the flight in the FIG. 2 version. It is carried along as dead weight during the balance of the mission. The FIG. 3 embodiment carries the power pack and PCM 31 on the external underside of the aircraft so that the power pack and PCM 31 can be jettisoned at the end of this boost phase when the ramjet engine can produce positive thrust. FIG. 4 shows the vehicle with the depleted power pack and PCM 31 being jettisoned from the vehicle. The battery pack and PCM 31 is packaged in a conformal arrangement external to the vehicle and centered about the vehicle center of gravity. The conformal arrangement provides a minimal drag penalty throughout the boost phase from a release point at approximately Mach 0.8 up to a fully transitional condition at Mach 2.5. The power pack and PCM 31 is jettisoned via transitional means including explosive fasteners and electrical latches.

During the ejection process, the electrical connection between the depleted power pack and PCM 31 and the vehicle is broken. Thus, a small supplemental battery pack is housed in the vehicle body to provide vehicle power as needed. As the battery pack and PCM 31 is now mounted external to the vehicle, the volume that was occupied by the power pack 31 in FIG. 2 can now carry additional fuel. The additional fuel results in a vehicle range increase on the order of 20%.

In another embodiment to the PCM being housed with the battery in the power pack external to the vehicle, the PCM can be retained in the vehicle separate from the battery pack.

The invention claimed is:

1. An aero vehicle comprising:
a power plant to propel the aero vehicle;
the power plant being a dual mode propulsion system with a first mode operation and a second mode operation;
the second mode of operation is at a greater speed then the first mode operation;
a compressor driven by an electric motor for the first mode operation;
a power pack mounted to the aero vehicle to supply electrical power to the electric motor for the first mode operation; and,
the power pack being capable of being released from the aero vehicle prior to the second mode operation of the power plant.

2. The aero vehicle of claim 1, and further comprising:
the power pack is mounted to an underside of the aero vehicle and centered about the aero vehicle center of gravity.

3. The aero vehicle of claim 1, and further comprising:
the first mode operation is below a ramjet speed; and,
the second mode of operation is at ramjet speed.

4. The aero vehicle of claim 1, and further comprising:
the dual mode propulsion system includes an outer annular duct burner and an inner annular core burner and a compressor located upstream of the core burner but inside of a flow path entering the duct burner;
the compressor providing compressed air to the core burner for propulsion below a ramjet speed; and,
the duct burner operating as a ramjet engine for propulsion at a ramjet speed.

5. The aero vehicle of claim 4, and further comprising:
the electric motor is located in a housing at an inlet of the dual mode propulsion system and is supported by struts.

6. The aero vehicle of claim 1, and further comprising:
the annular inner core burner is located radially inward of the annular outer duct burner.

7. A process for operating an aero vehicle having a dual mode propulsion system comprising the steps of:
operating the dual mode propulsion system in a first mode below a ramjet speed using a compressor driven by an electric motor supplied with electrical power from a power pack mounted to the aero vehicle;
dropping the power pack from the aero vehicle when the vehicle speed is fast enough for a ramjet engine to produce positive thrust; and,
operating the dual mode propulsion system as a ramjet engine.

8. The process for operating an aero vehicle having a dual mode propulsion system of claim 7, and further comprising the step of:
mounting the power pack on an underside of the vehicle at substantially a center of gravity of the vehicle.

* * * * *